Nov. 30, 1965        S. M. CHRISTIAN        3,220,273
COMPOSITE SPROCKET FOR CONTINUOUS MINING MACHINE
Filed Dec. 26, 1963
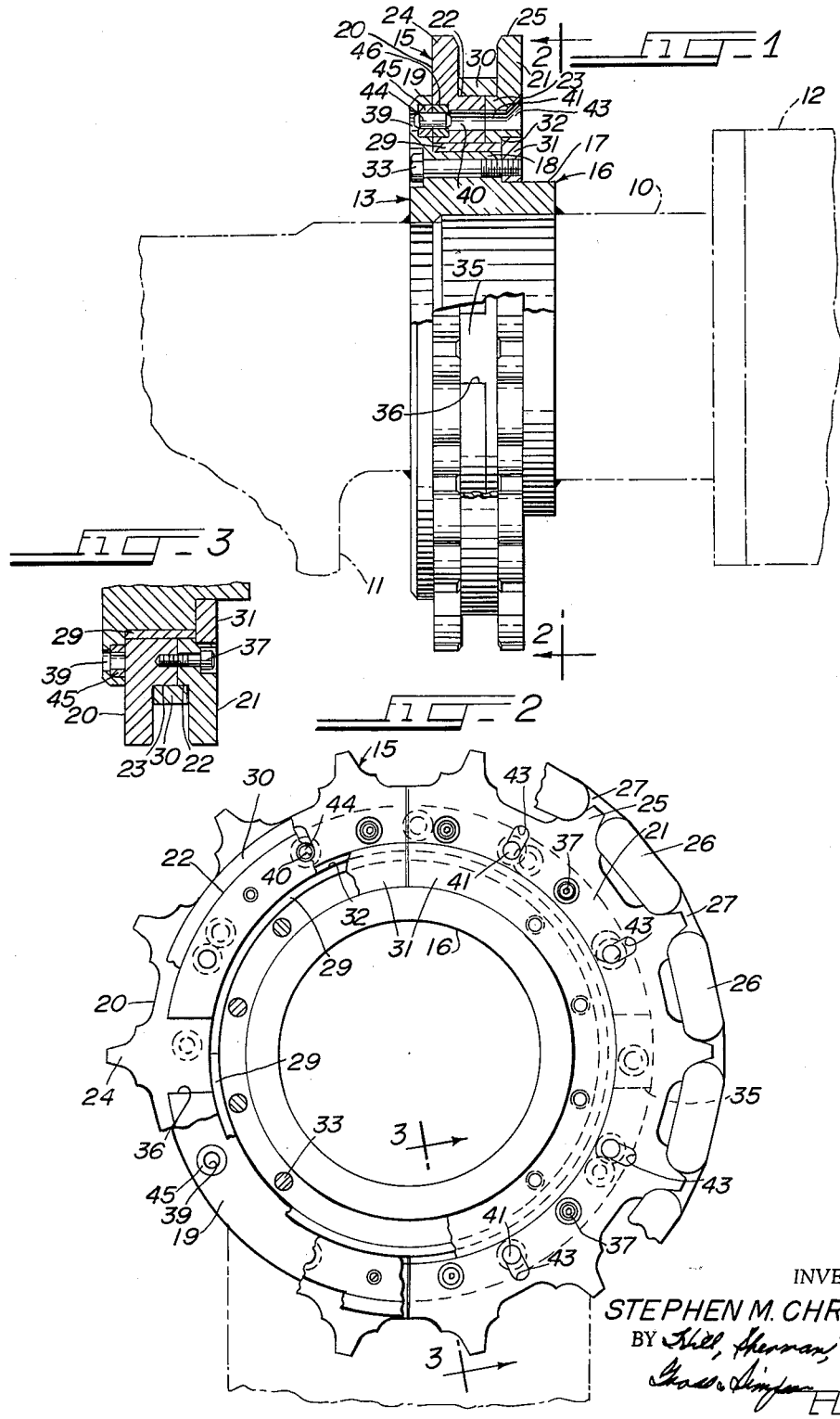
INVENTOR.
STEPHEN M. CHRISTIAN

United States Patent Office 3,220,273
Patented Nov. 30, 1965

3,220,273
COMPOSITE SPROCKET FOR CONTINUOUS MINING MACHINE
Stephen M. Christian, Harvey, Ill., assignor to Goodman Manufacturing Company, Chicago, Ill., a corporation of Illinois
Filed Dec. 26, 1963, Ser. No. 333,421
10 Claims. (Cl. 74—243)

This invention relates to improvements in sprockets and more particularly relates to an improved form of composite sprocket particularly adapted for continuous mining machines and the like.

In continuous mining machines of the boring type, in which two or more boring heads cut contiguous bores in a mine face and mine out the entire face from one rib of the working place to the other, the cusps left between the bores and extending upwardly from the mine floor and depending from the mine roof are trimmed by upper and lower trimmer chains guided to travel along the floor and roof the mine, and carrying cutter bits to effect the cutting and trimming operation.

The trimmer chains are usually driven from a drive sprocket on the hollow boring head support and drive shaft, and positioned inwardly of the boring head proper. Due to the rigorous service to which continuous mining machines are put, the drive sprocket is subject to wear and breakage, resulting in frequent replacement of the sprockets.

When it becomes necessary to replace the drive sprocket, due to the confined area in which the drive sprocket is located behind the boring head, it is usually necessary to remove the entire boring head and shaft from the machine to remove the worn or broken sprocket and replace it with a new sprocket. This is a costly and time consuming operation, tying up the machine for long periods of time, and oftentimes making it necessary to remove the machine from the working place and replace the sprocket.

A principal object of the present invention is to remedy the foregoing deficiencies in continuous mining machines by providing a drive sprocket of a composite form, replaceable on its drive shaft without disassembling the drive shaft or other parts driven therefrom.

Another object of the invention is to provide an improved form of drive sprocket particularly adapted for mounting in confined places and including at least two semi-annular sprocket parts assembled and retained to a hub structure which may be permanently mounted on and driven from the hub structure by a simplified form of shear pin arrangement, in which only one shear pin may be assembled to the hub structure and drive sprocket and in which a plurality of registrable positions are provided between the hub structure and drive sprocket, any one of which may be moved into registry to receive the shear pin.

A further object of the present invention is to provide a composite sprocket particularly adapted for driving the trimmer chains of continuous mining machines and the like, in which the sprocket is in the form of a plurality of sprocket parts readily assembled to and disassembled from a hub, without removing the hub from its drive shaft, and registered and retained in registry with respect to each other and driven from the hub in a novel and simple manner.

These and other objects of the invention will appear from time to time as the following specification proceeds and with reference to the accompanying drawing wherein:

FIGURE 1 is a view in side elevation of a drive sprocket constructed in accordance with the principles of the present invention, showing the sprocket mounted on the drive shaft of the boring head of a continuous mining machine, with parts of the sprocket broken away and other parts shown in vertical section.

FIGURE 2 is an end view of the sprocket shown in FIGURE 1 looking at the sprocket along lines 2—2 of FIGURE 1, with certain parts removed and broken away in order to illustrate the detailed features of the invention; and FIGURE 3 is a partial fragmentary transverse sectional view taken substantially along line 3—3 of FIGURE 2.

In FIGURE 1 of the drawings, I have shown in phantom a drive shaft 10 for a boring head 11 of a continuous mining machine of the boring type. The boring head 11 may be of a conventional form having one or more boring arms having cutters supported thereon and extending radially of the shaft 10, so need not herein be shown or described further. The shaft 10 is journalled in a hub 12 extending from a cutter frame (not shown) supporting and driving the boring head in a conventional manner and no part of the present invention, so not shown or described in detail.

Mounted on and secured to the shaft 10 between the boring head 11 and hub 12 is a spider 13 carrying a composite sprocket 15. The spider 13 is shown as being welded to the shaft 10 to be driven from said shaft, but may be secured to said shaft in any suitable manner.

As shown in FIGURE 1, the spider 13 includes a stepped hub 16 having a reduced diameter periphery 17 and enlarged diameter periphery 18 and having a radial flange 19 extending radially of the enlarged diameter periphery 18 on the side thereof facing the boring head 11. The radial flange 19 is abutted by two semi-annular sprocket parts 20, 20 of the composite sprocket 15, and serves as a drive means for said composite sprocket in a manner which will hereinafter more clearly appear as this specification proceeds.

The composite sprocket 15 also includes two other sprocket parts 21, 21 abutting the sprocket parts 20, 20 and rotatably driven by said sprocket parts. As shown in FIGURES 1 and 2, each sprocket part 20 has a flange or base portion 22 abutting a flange or base portion 23 of the next adjacent sprocket part 21. The sprocket parts 20 and 21 have the usual sprocket teeth 24 and 25 extending radially of the respective flanges or base portions 22 and 23 and meshing between the links of a trimmer chain 26 on opposite sides of said chain, and extending along the outer sides of blocks, 27, 27 of said chain.

The sprocket parts 20, 20 and 21, 21 are shown as being mounted on a split sleeve 29 made in two halves being mounted on and extending about the enlarged diameter portion 18 of the hub 16. Said sleeve and sprocket parts are held in assembled relation with respect to each other by a ring 30 extending about the aligned bases 22 and 23. A retainer ring 31 encircles the reduced diameter portion 17 of the hub 16 and abuts a shouldered portion 32 of the sprocket parts 21 and is held in abutting engagement with said shouldered portion by a series of cap screws 33, extending through the enlarged diameter portion 18 of the hub 16, and threaded within said retainer ring. The cap or machine screws 33 are accessible from the outside of the boring head to enable the retainer ring to be readily removed from the sprocket parts 21, 21.

The sprocket parts 20, 20 and 21, 21 have interengagement with each other to effect rotation of said sprocket parts together and to avoid slippage between said adjacent sprocket halves. As shown in FIGURES 1 and 2 the interengaging connection comprises a dog or jaw 35 extending from the sprocket part 21 and fitting within a groove or notch 36 in the adjacent sprocket part 20. The dogs 35 and grooves 36 are shown in FIGURE 2 as being in diametrically opposed relation with respect to each other.

The sprocket parts 21 are also retained to the sprocket parts 20 upon complete assembly of the sprocket by machine screws 37, recessed within the sprocket part 21 and threaded in the adjacent sprocket part 20, radially inwardly of the base thereof.

Referring now in particular to the drive connection from the flange 19 of the spider 13 to the composite sprocket, the flange 19 has a plurality of circumferentially spaced and aligned holes or apertures 39 drilled therethrough, one of said holes being adapted to register with a set of axially aligned circumferentially spaced holes 40 and 41 drilled through the sprocket parts 20 and 21. Each hole 41 terminates into an elongated slot 43 opening toward the hub 12 to accommodate ready removal of a shear pin 44 from said holes.

The hole 39 is shown as having a hardened bushing 45 recessed therein from the inside of the radial flange 19. In a like manner the hole 40 is shown as having a hardened bushing 46 recessed therein and abutting the bushing 45. The registering bushings 45 and 46 have the shear pin 44 drive therein to drive the sprocket parts 20 from the radial flange 19, and to shear upon overload conditions.

It may be seen from FIGURES 2 and 3 that the bushings 45 and 46 and their registering holes receiving said bushings are spaced equal radial distances from the center of the flange 19 and sprocket parts 20 and 21 and are spaced circumferentially about said flange and sprocket parts and that when two bushings 45 and 46 are in registry, the other bushings 45 and 46 are out of registry. The shear pin 44 may then be driven through the registering bushings to drive the sprocket parts 20 and 21 from the radial flange 19 of the spider 13. The purpose of the plurality of holes and bushings is to facilitate the assembly of the sprocket parts and to provide enough circumferentially spaced bushings, to enable the sprocket to be assembled many times, even though the bushings may be broken or distorted each time a shear pin is broken.

In disassembling the composite sprocket for replacement or repair, the shear pin 44 may first be driven from the mating bushings 45 and 46 through the elongated portions 43 of the holes 41. The machine screws 33 may then be loosened to release the retainer ring 31 and allow the sprocket parts to be removed from the sleeve 29. The machine screws 36 may then be removed and the sprocket parts 21, 21 may then freely be removed from the sprocket parts 20, 20. The ring 30 may then be removed to accommodate the sprocket parts 20, 20 and the sleeve sections 29 to be separated and removed from the hub 16.

In assembling the sprocket, the sprocket parts 20, 20 and sleeve 29 are first assembled on the enlarged diameter portion 18 of the hub 16 and are held to said hub by the ring 30, extending about the bases 22, 22 of said sprocket parts. The inner sprocket parts 21, 21 are then assembled on the sleeve 29 with the dogs 35 moved into engagement with the grooves 36 and the bases 23 moved under the ring 30 to be retained from separation by said ring. The retainer ring 31 is then moved along the reduced diameter portion 17 of the hub 16 into engagement with the shouldered portion 32 of each sprocket part 21 and secured thereto as by the machine screws 33.

It may be seen from the foregoing that an effective and simplified form of composite sprocket has been provided in which the entire sprocket may be removed from its hub without removing the hub from its drive shaft, and in which the assembly of the sprocket is simplified by making the sprocket parts in mating parts with one set of sprocket parts in abutting engagement with another set of sprocket part and driven by a simplified form of shear pin arrangement, in which the shear pin may readily be removed when sheared by excessive load, and a new shear pin may be replaced in the same or in a new location without removing the sprocket from its hub.

It may further be seen that the assembly and disassembly of the sprocket does not interfere with the other parts of the machine, making it practical for use in confined spaces and particularly driving heavy equipment such as the trimmer chain of a continuous mining machine, and that when the sprocket is once assembled it forms a unitary sprocket structure of the rigidity of the conventional one piece sprocket used on continuous mining machines or for driving other heavy equipment.

While I have herein shown and described one form in which the invention may be embodied, it should be understood that various modifications and variations in the invention may be attained without departing from the spirit and scope of the novel concepts thereof.

I claim as my invention:

1. A sprocket comprising a spider having a hub and a flange extending radially of said hub, at least two registering sprockets parts mounted on said hub, each having a base and sprocket teeth extending generally radially therefrom, a ring extending about said bases and retaining said sprocket parts in registry, means retaining said ring to said sprocket parts, and a shear pin forming a drive connection between said flange and said sprocket parts.

2. A drive sprocket comprising a spider having a hub having a flange extending radially thereof, two registering sprocket parts mounted on said spider, each having a base and sprocket teeth extending generally radially therefrom, a ring extending about said base and retaining said sprocket parts in registry on said hub, means retaining said ring to said sprocket parts, said radial flange and said sprocket parts each having a plurality of apertured portions, the apertures of which extend axially of said spider, one aperture on said flange being in registry with one aperture in said sprocket parts and the other apertures being out of registry with respect to each other, and a shear pin mounted in the registering apertures and forming a drive connection between said flange and said sprocket parts.

3. A drive sprocket comprising a spider having a hub and a flange extending radially of said hub, at least two registering sprocket parts mounted on said hub, each sprocket part having a base and sprocket teeth extending generally radially therefrom, a ring extending about said base and retaining said sprocket parts to said hub in registry with each other, means retaining said ring to said sprocket parts, said flange and said sprocket parts having a plurality of circumferentially spaced bushings therein, one bushing in said flange being registrable with a corresponding bushing in a sprocket part and the other bushings being out of registry, and a shear pin extending through the registering bushings and forming a drive connection between said flange and said sprocket parts.

4. In a composite drive sprocket, a spider having a hub and a flange extending radially of said hub at one side thereof, two adjacent sets of sprocket parts mounted on said hub and extending thereabout, each sprocket part having a base and sprocket teeth extending generally radially of said base, and two circumferentially aligned sprocket paths abutting said flange, an interengaging connection between said sets of adjacent sprocket parts, means retaining said sprocket parts in registry with each other, and means for driving said sprocket parts comprising a shear pin connected between said flange and one of said sprocket parts.

5. In a composite sprocket, a spider having a hub and a flange extending radially of said hub, two sets of sprocket parts extending about said hub in side by side relation with respect to each other, one of said sets of sprocket parts abutting said radial flange, each sprocket part having a base having sprocket teeth extending generally radially of said base, an interengaging driving connection between one sprocket part and its next adjacent sprocket part comprising a dog extending from one sprocket part and a notch in the other sprocket part interengaged by said dog, a ring extending about said bases and retaining said sprocket parts to said hub, means retaining two sprocket parts to said ring and retaining said ring to said sprocket parts, and a driving connection between said flange and the two adjacent sprocket parts abutting said flange.

6. A composite sprocket in accordance with claim 5 in which the driving connection between the sprocket parts includes a plurality of circumferentially spaced drilled portions extending through said sprocket parts, a plurality of circumferentially spaced drilled portions extending through said flange, one of said drilled portions in said flange being registrable with one of said drill portions in said sprocket parts and the other of said drilled portions being out of registry, and a shear pin extending through the registered drilled portions and providing a driving connection between said flange and sprocket parts.

7. A composite sprocket in accordance with claim 6 wherein said sprocket parts and flange are through drilled in a plurality of circumferentially aligned places, each through drilled portion being spaced an equal radial distance from the center of said spider, one of said through drilled portions of said flange being registrable with one of said through drilled portions of said sprocket parts and the other of said through drilled portions being out of registry with said other through drilled portions of said sprocket parts, and a shear pin extending through the registering through drilled portions and forming a drive connection between said flange and sprocket parts, said shear pin being driven into said through drilled portions from the outside of said flange and the through drilled portions of the sprocket parts opposite said flange being elongated to accommodate ready punching of broken shear pins through said sprocket parts.

8. A composite sprocket in accordance with claim 7 in which bushings are mounted in said through drilled portions of said sprocket parts and said flange, and the shear pin is driven into aligned bushings to form the drive connection between said sprocket parts.

9. In a composite sprocket, a spider having a hub and a flange extending radially therefrom, two sets of adjacent sprocket parts mounted on said hub, each set including a base and sprocket teeth extending radially therefrom, one set of sprocket parts abutting said flange, a ring encircling said base of said set of sprocket parts abutting said flange and extending outwardly therefrom and receiving said base of said two other sprocket parts, one sprocket part of one set of sprocket parts having a dog extending axially therefrom toward the other sprocket part and the other sprocket part having a notch receiving said dog, a retainer secured to said hub and retaining said sprocket parts thereto in driving engagement with each other, and a replaceable drive connection between said flange and said sprocket parts comprising a plurality of circumferentially aligned apertures extending through said sprocket parts and equally spaced from the axis of rotation of said sprocket parts, a plurality of circumferentially aligned apertures extending through said flange and having the same radial spacing from the axis of rotation of said sprocket parts as said apertures extending through said sprocket parts, any one aperture extending through said flange being registrable with any one set of aligned apertures extending through said sprocket parts and the other apertures being out of alignment when one aperture is aligned with said apertures extending through said sprocket parts, and a shear pin extending through said apertures and removable upon breakage through said sprocket parts.

10. A composite sprocket in accordance with claim 9 in which said apertures in said flange and said sprocket parts have hardened bushings therein and wherein said shear pin is mounted in registering bushings.

References Cited by the Examiner
UNITED STATES PATENTS

| | | | |
|---|---|---|---|
| 932,064 | 8/1909 | Slick | 74—243 X |
| 2,525,516 | 10/1950 | Bergmann et al. | 74—243 X |
| 3,082,637 | 3/1963 | Paxton | 74—243 |
| 3,083,585 | 4/1963 | Dawe et al. | 74—243 |

DON A. WAITE, *Primary Examiner.*